United States Patent
Yamamoto et al.

(10) Patent No.: US 9,216,639 B2
(45) Date of Patent: Dec. 22, 2015

(54) CONTROL DEVICE FOR VEHICLE

(71) Applicants: Koji Yamamoto, Okazaki (JP); Takayoshi Okuda, Nagoya (JP); Hideaki Yaguchi, Toyota (JP); Toshiya Hashimoto, Miyoshi (JP)

(72) Inventors: Koji Yamamoto, Okazaki (JP); Takayoshi Okuda, Nagoya (JP); Hideaki Yaguchi, Toyota (JP); Toshiya Hashimoto, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 14/366,240

(22) PCT Filed: Dec. 25, 2012

(86) PCT No.: PCT/JP2012/083410
§ 371 (c)(1),
(2) Date: Jun. 17, 2014

(87) PCT Pub. No.: WO2013/103105
PCT Pub. Date: Jul. 11, 2013

(65) Prior Publication Data
US 2014/0365054 A1   Dec. 11, 2014

(30) Foreign Application Priority Data
Jan. 5, 2012   (JP) ................................ 2012-000764

(51) Int. Cl.
*B60K 6/445*   (2007.10)
*B60L 11/18*   (2006.01)
(Continued)

(52) U.S. Cl.
CPC . *B60K 6/445* (2013.01); *B60L 7/14* (2013.01); *B60L 11/123* (2013.01); *B60L 11/14* (2013.01);
(Continued)

(58) Field of Classification Search
CPC ..... B60K 6/445; B60L 11/1861; B60L 15/20; B60L 7/14; B60L 11/123; B60L 11/14; F02D 41/065; F02D 11/105; F02N 11/0814; B60W 10/02; B60W 20/40; B60W 10/06; Y02T 10/705; Y02T 10/7241; Y02T 10/70
USPC .......................................................... 701/22
See application file for complete search history.

(56) References Cited

U.S. PATENT DOCUMENTS 6,358,180 B1 * 3/2002 Kuroda ................... B60K 6/48
477/183
6,504,259 B1 * 1/2003 Kuroda ................... B60K 6/46
180/65.25

(Continued)

FOREIGN PATENT DOCUMENTS

JP   A-2001-233088   8/2001
JP   A-2004-092623   3/2004

(Continued)

*Primary Examiner* — Mary Cheung
*Assistant Examiner* — Frederick Brushaber
(74) *Attorney, Agent, or Firm* — Oliff PLC

(57) ABSTRACT

If the accelerator is on upon restarting a driving force source in travel mode by the time when the vehicle comes to a standstill after the driving force source is manually operated to stop while the vehicle is traveling, a control device for the vehicle implements first control in which the driving force output to the drive wheels is gradually increased. If the accelerator is on upon switching to the travel mode following restarting of the driving force source in the neutral mode and by the time the vehicle comes to a standstill after the driving force source is manually operated to stop while the vehicle is traveling, the control device implements second control in which the driving force output to the drive wheels is increased. The first control increases the driving force not as much as the second control increases the driving force.

6 Claims, 11 Drawing Sheets

(51) Int. Cl.
*B60L 15/20* (2006.01)
*B60L 7/14* (2006.01)
*B60L 11/12* (2006.01)
*B60L 11/14* (2006.01)
*B60W 10/06* (2006.01)
*B60W 10/02* (2006.01)
*B60W 20/00* (2006.01)
*F02D 41/06* (2006.01)
*F02N 11/08* (2006.01)
*F02D 11/10* (2006.01)

(52) U.S. Cl.
CPC ............ *B60L 11/1861* (2013.01); *B60L 15/20* (2013.01); *B60W 10/02* (2013.01); *B60W 10/06* (2013.01); *B60W 20/40* (2013.01); *F02D 11/105* (2013.01); *F02D 41/065* (2013.01); *F02N 11/0814* (2013.01); *B60L 2210/40* (2013.01); *B60L 2220/14* (2013.01); *B60L 2240/12* (2013.01); *B60L 2240/421* (2013.01); *B60L 2240/423* (2013.01); *B60L 2240/441* (2013.01); *B60L 2240/445* (2013.01); *B60L 2240/461* (2013.01); *B60L 2240/486* (2013.01); *B60L 2240/507* (2013.01); *B60L 2240/545* (2013.01); *B60L 2240/547* (2013.01); *B60L 2240/549* (2013.01); *B60L 2250/24* (2013.01); *B60L 2250/26* (2013.01); *B60L 2260/26* (2013.01); *B60W 2540/10* (2013.01); *F02D 2200/602* (2013.01); *F02D 2250/21* (2013.01); *Y02T 10/48* (2013.01); *Y02T 10/6217* (2013.01); *Y02T 10/6239* (2013.01); *Y02T 10/642* (2013.01); *Y02T 10/7005* (2013.01); *Y02T 10/705* (2013.01); *Y02T 10/7044* (2013.01); *Y02T 10/7077* (2013.01); *Y02T 10/7241* (2013.01); *Y02T 10/7275* (2013.01)

(56) References Cited

U.S. PATENT DOCUMENTS

| | | | | |
|---|---|---|---|---|
| 6,532,926 | B1* | 3/2003 | Kuroda | B60H 1/00778 123/179.4 |
| 8,002,058 | B2 | 8/2011 | Ishikawa | |
| 8,955,494 | B2* | 2/2015 | Nakamura | B60K 6/48 123/345 |
| 2002/0116113 | A1* | 8/2002 | Kaneko | F02D 41/065 701/112 |
| 2013/0138328 | A1* | 5/2013 | Shimo | F02D 41/062 701/104 |
| 2014/0107910 | A1* | 4/2014 | Mamada | F02D 41/045 701/113 |
| 2014/0316628 | A1* | 10/2014 | Miyashita | B60R 16/0236 701/22 |

FOREIGN PATENT DOCUMENTS

| | | |
|---|---|---|
| JP | A-2007-023919 | 2/2007 |
| JP | A-2007-216833 | 8/2007 |
| JP | A-2010-018174 | 1/2010 |
| JP | A-2010-179882 | 8/2010 |

* cited by examiner

CONTROL DEVICE FOR VEHICLE

TECHNICAL FIELD

The present invention relates to control devices for vehicles.

BACKGROUND ART

Popularly known vehicles (conventional vehicles), including automobiles, rely solely on gasoline, diesel, or like engines (internal combustion engines) for travel driving force. Recently, environmental-friendly vehicles, such as hybrid vehicles, electric vehicles (EVs), and fuel cell vehicles, have been developed and put into commercial use.

Among the latter vehicles, the hybrid vehicle is provided with an engine and an electric motor (e.g., motor generator or motor) that operates on the electric power either generated from the engine output or stored in a battery (electric storage device). The hybrid vehicle is capable of traveling by using either the engine or the electric motor or both as a driving force source(s).

Hybrid vehicles have a power switch for turning on/off the hybrid system (driving force source). For example, manually operating the power switch with the brake pedal being depressed by the driver starts the hybrid system. Meanwhile, manually operating the power switch while the vehicle is traveling stops the hybrid system.

Patent Document 1 listed below describes technology related to the starting/stopping of the hybrid system in a hybrid vehicle. According to the technology, if the vehicle startup/stop switch is shifted to an engine stop position (Off position, Ready-Off, etc.) while the vehicle is traveling at high speed, the battery is protected by prohibiting the engine from stopping so that the battery discharge does not exceed a maximum discharge limit.

CITATION LIST

Patent Literature

Patent Document 1:
Japanese Patent Application Publication, Tokukai, No. 2007-216833
Patent Document 2:
Japanese Patent Application Publication, Tokukai, No. 2004-92623

SUMMARY OF THE INVENTION

Problems to Be Solved by the Invention

After the driver has operated the hybrid system to stop the system while the hybrid vehicle is traveling, the driver may manually operate the hybrid system to have it started before the hybrid vehicle comes to a complete stop (while it is still moving due to its inertia). If the accelerator is on at that time, driving force is excessively quickly generated (restored), which could lead to poor drivability.

This applies equally to conventional vehicles, electric vehicles, and fuel cell vehicles.

The technology described in Patent Document 1 prohibits the engine from being forcibly stopped when the vehicle startup/stop switch is shifted to an engine stop position while traveling at high speed. The technology does not consider the possibility of a manual Ready-On operation after the engine is stopped while traveling. The technology does not at all consider the possibility of restoring driving force upon restarting neither.

The present invention, conceived in view of the state of art, has an object to provide a control device for a vehicle capable of restraining degrading drivability upon restarting a driving force source after the driving force source is stopped while the vehicle is traveling.

Solution to Problem

A control device for a vehicle according to the present invention is applied to a vehicle provided with a driving force source for supplying a travel driving force to a drive wheel and capable of switching between travel mode and neutral mode. The control device, if an accelerator is on upon restarting the driving force source in the travel mode by the time when the vehicle comes to a standstill after the driving force source is manually operated to stop while the vehicle is traveling, implements first control in which the travel driving force is gradually increased; and if the accelerator is on upon switching to the travel mode following restarting of the driving force source in the neutral mode by the time when the vehicle comes to a standstill after the driving force source is manually operated to stop while the vehicle is traveling, implements second control in which the travel driving force is increased. The first control increases the travel driving force not as much as the second control increases the travel driving force.

For the accelerator to be on upon restarting the driving force source, the accelerator may have been on since before or since the restarting of the driving force source. For the accelerator to be on upon switching to the travel mode, the accelerator may have been on since before or since the switching from the neutral mode to the travel mode.

In this arrangement, if the accelerator is on upon restarting the driving force source in travel mode after the driving force source is manually operated to stop while the vehicle is traveling, the first control is implemented to supply a gradually increasing driving force to the drive wheel without supplying the driving force per se that corresponds to the accelerator opening degree. Therefore, the arrangement is capable of restraining degrading drivability upon restoring driving force.

In addition, if the accelerator is on upon switching to the travel mode following restarting of the driving force source in the neutral mode after the driving force source is manually operated to stop while the vehicle is traveling, since it is likely that the driver is intending to increase the driving force, the second control is implemented to supply to the drive wheel a driving force that increases at a greater rate of increase than in the first control. The arrangement is hence capable of readily restoring driving force while restraining degrading drivability upon restoring driving force.

In the control device, the first control and the second control may be implemented by controlling a driving force output from the driving force source based on a moderated accelerator opening degree obtained from an actual accelerator opening degree through a moderation process. When this is the case, a moderation coefficient for the moderation process may be set to a greater value for relatively high actual accelerator opening degrees than for relatively low actual accelerator opening degrees.

This arrangement is capable of restraining degrading drivability more efficiently for high accelerator depression levels.

In the control device, the travel driving force source may include an engine and an electric motor.

In the control device, the travel driving force source may include an engine only.

In the control device, the travel driving force source may include an electric motor only.

Advantageous Effects of the Invention

The present invention supplies a gradually increasing driving force from a driving force source to a drive wheel upon restarting the driving force source after the driving force source is manually operated to stop while the vehicle is traveling. Therefore, the invention is capable of restraining degrading drivability upon restarting the driving force source.

DESCRIPTION OF EMBODIMENTS

The following will describe embodiments of the present invention in reference to drawings.

Embodiment 1

Figure 1:
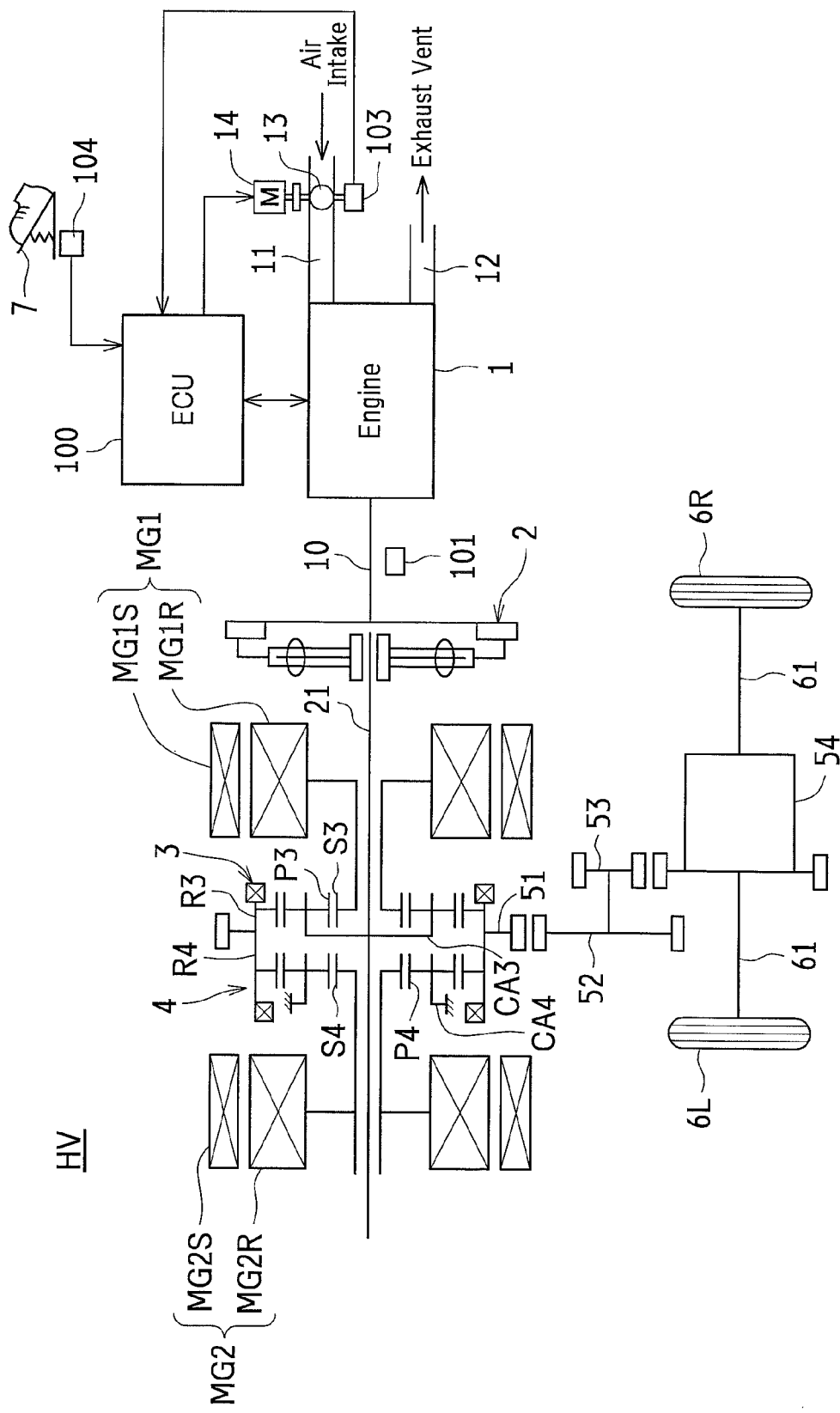
FIG. 1 is a schematic illustration of an exemplary vehicle to which the present invention is applicable.

FIG. 1 is a schematic illustration of an exemplary vehicle to which the present invention is applicable.

This exemplary vehicle is an FF (front engine & front drive) hybrid vehicle HV. The vehicle includes, for example, an engine (internal combustion engine) 1 generating a travel driving force for the vehicle, a first motor generator MG1 acting primarily as an electric power generator, a second motor generator MG2 acting primarily as an electric motor, a power split mechanism 3, a reduction mechanism 4, counter drive gears 51, counter driven gears 52, final gears 53, a differential device 54, front wheel axles (drive shafts) 61, front wheels (drive wheels) 6L and 6R, rear wheels (follower wheels, not shown), and an ECU (electronic control unit) 100. The ECU 100 executes computer programs to realize the control device for a vehicle of the present invention.

Note that the ECU 100 may include, to name a few, an HV (hybrid) ECU, an engine ECU, and a battery ECU, all of which are connected so that they can communicate with each other.

Next will be described some of these components including the engine 1, the motor generators MG1 and MG2, the power split mechanism 3, the reduction mechanism 4, and the ECU 100.

Engine

The engine 1 is a publicly known power generating apparatus (internal combustion engine), such as a gasoline engine or a diesel engine, that combusts fuel for power output. The engine 1 is so structured that it can control the throttle opening degree (air intake rate) of a throttle valve 13 disposed on an air intake path 11, a fuel injection rate, an ignition period, and other operating conditions. Following combustion, exhaust gas flows through an exhaust path 12 for purification with oxidation catalyst (not shown) before being discharged to open air.

To control the throttle valve 13 of the engine 1, electronic throttle control is employed in which the throttle opening degree is so controlled as to achieve an optimal air intake rate (target air intake rate) according to some conditions of the engine 1, for example, the engine rotational speed and the driver-controllable accelerator pedal depression (accelerator opening degree). In such electronic throttle control, the actual throttle opening degree of the throttle valve 13 is detected using a throttle opening degree sensor 103, and a throttle motor 14 for the throttle valve 13 is feedback controlled so that the actual throttle opening degree matches a throttle opening degree at which the target air intake rate is achieved (target throttle opening degree).

The output from the engine 1 is transmitted to an input shaft 21 via a crankshaft (output shaft) 10 and a damper 2. The damper 2 is, for example, a coil spring-loaded transaxle damper and absorbs torque variations of the engine 1.

Motor Generator

The first motor generator MG1 is an AC synchronous generator provided with a rotor MG1R made of a permanent magnet supported freely rotatable around the input shaft 21 and a stator MG1S around which three phase windings are wound. The first motor generator MG1 acts as both an electric power generator and an electric motor. Similarly, the second motor generator MG2 is an AC synchronous generator provided with a rotor MG2R made of a permanent magnet supported freely rotatable around the input shaft 21 and a stator MG2S around which three phase windings are wound. The second motor generator MG2 acts as both an electric motor and an electric power generator.

Figure 2:
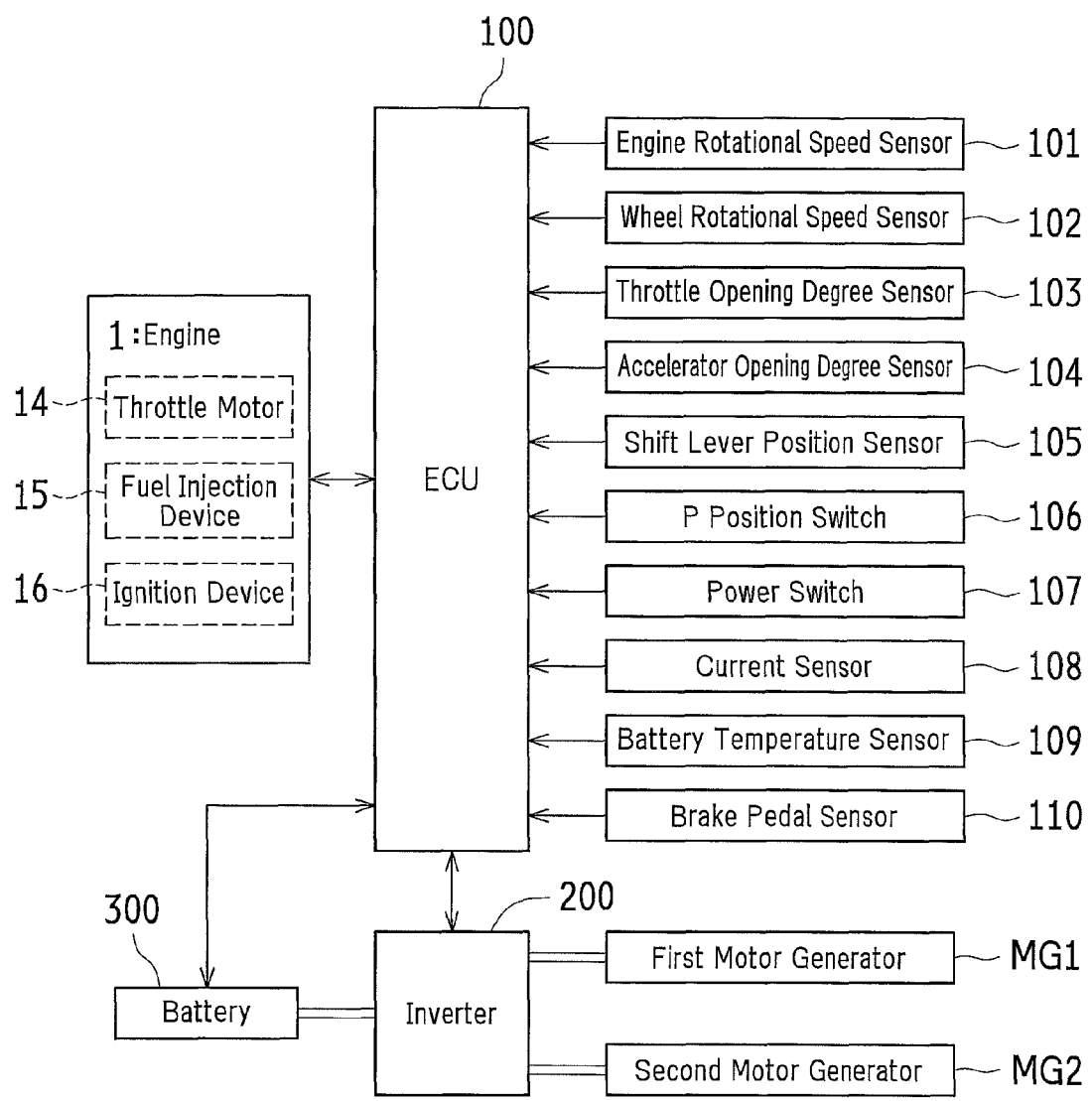
FIG. 2 is a block diagram of the architecture of an ECU or like control system.

As illustrated in FIG. 2, the first motor generator MG1 and the second motor generator MG2 are connected to a battery (electric storage device) 300 via an inverter 200. The inverter 200 is controlled by the ECU 100. The motor generators MG1 and MG2 are each switched between regenerative mode or motoring (assist) mode by the inverter 200. The electric power generated in regenerative mode is fed through the inverter 200 before charging the battery 300. The electric power for powering the motor generators MG1 and MG2 is supplied from the battery 300 via the inverter 200.

Power Split Mechanism

The power split mechanism 3, as illustrated in FIG. 1, is built around a planetary gear mechanism including a sun gear S3, a pinion gear P3, a ring gear R3, and a planetary carrier CA3. The sun gear S3 is an external gear that self-rotates at the center of a plurality of gear elements. The pinion gear P3 is an external gear that self-rotates and simultaneously revolves around and in contact with the sun gear S3. The ring gear R3 is an internal gear formed hollow and annular to mesh with the pinion gear P3. The planetary carrier CA3 supports the pinion gear P3 and self-rotates due to the revolution of the pinion gear P3. The planetary carrier CA3 is coupled to the crankshaft (output shaft) 10 of the engine 1 via the input shaft 21 and the damper 2. The sun gear S3 is coupled to the rotor MG1R (rotation axis) of the first motor generator MG1 so that the sun gear S3 and the first motor generator MG1 can rotate integrally.

The power split mechanism 3 transmits at least one of driving forces from the engine 1 and the second motor generator MG2 to the left and right drive wheels 6L and 6R via the counter drive gears 51, the counter driven gears 52, the final gears 53, the differential device 54, and the drive shafts 61.

Reduction Mechanism

The reduction mechanism 4, as illustrated in FIG. 1, is built around a planetary gear mechanism including a sun gear S4, a pinion gear P4, and a ring gear R4. The sun gear S4 is an external gear that self-rotates at the center of a plurality of gear elements. The pinion gear P4 is an external gear that is supported freely rotatable by the planetary carrier (transaxle case) CA4 and self-rotates in contact with the sun gear S4. The ring gear R4 is an internal gear formed hollow and annular to mesh with the pinion gear P4. The ring gear R4 of the reduction mechanism 4, the ring gear R3 of the power split mechanism 3, and the counter drive gears 51 are integral. The sun gear S4 is coupled to the rotor MG2R (rotation axis) of the second motor generator MG2 so that the sun gear S4 and the rotor MG2R can rotate integrally.

The reduction mechanism 4 decelerates a driving force from the second motor generator MG2 at a suitable deceleration ratio. The decelerated driving force is transmitted to the left and right drive wheels 6L and 6R via the counter drive gears 51, the counter driven gears 52, the final gears 53, the differential device 54, and the drive shafts 61.

Manual Shift Device

Figure 3:
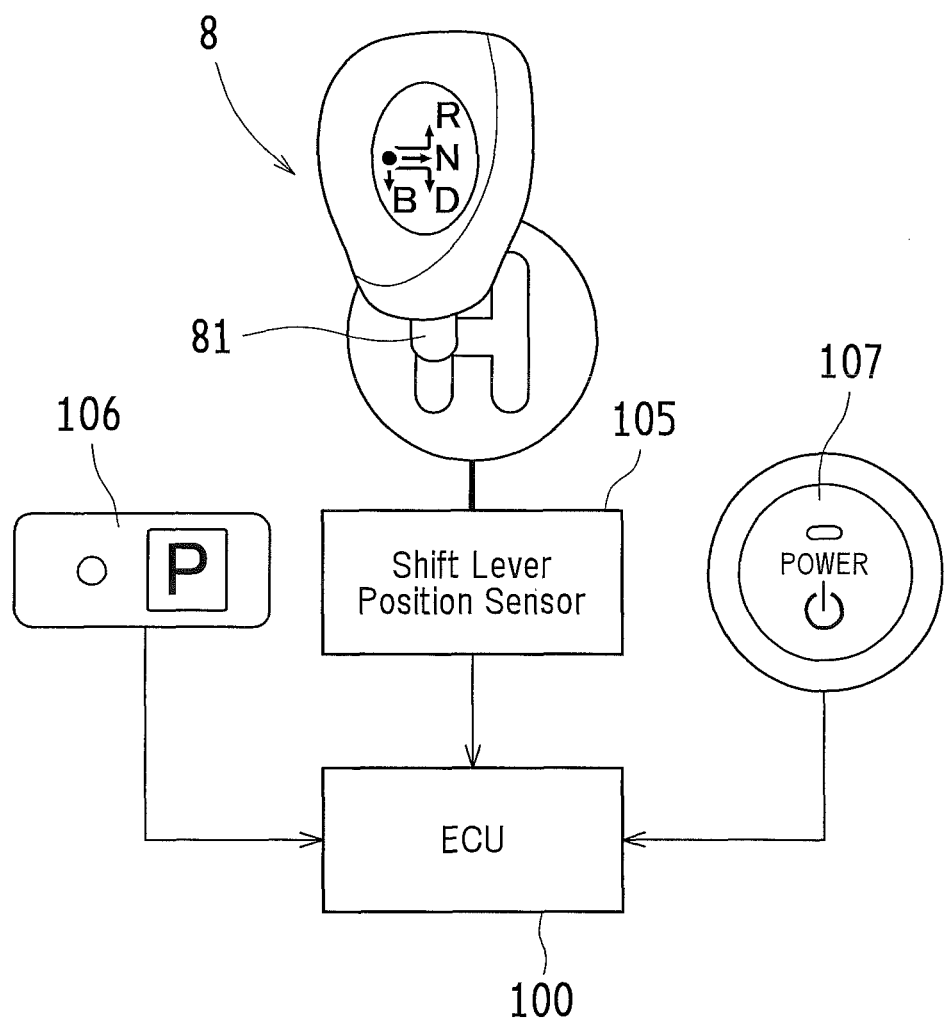
FIG. 3 is a schematic view of a manual shift device for the hybrid vehicle in FIG. 1.

This exemplary hybrid vehicle HV has a manual shift device 8 shown in FIG. 3. The manual shift device 8 is provided with a shift lever 81 so that the shift lever 81 can be shifted between positions. This exemplary manual shift device 8 switches between a drive position (D position) for forward travel, a brake position (B position) used during forward travel for a large braking force (engine braking) when the accelerator is off, a reverse position (R position) for backward travel, and a neutral position for neutral mode (N position). The manual shift device 8 also allows the driver to shift the shift lever 81 to a desired one of these positions. The shift lever 81, as it is shifted to any one of the D, B, R, and N positions, is detected by a shift lever position sensor 105. Output signals from the shift lever position sensor 105 are fed to the ECU 100.

There is provided a P position switch 106 near the shift lever 81 to switch to a parking position (P position) for parking. The P position switch 106 is for toggling between the parking position (P position) and the non-parking positions (non-P positions). The P position switch 106 feeds a manual operation signal to the ECU 100 if manually operated by the driver.

Power Switch

The hybrid vehicle HV is provided with a power switch 107 (see FIGS. 2 and 3) for turning on/off the hybrid system. The power switch 107 is, for example, a momentary-type push button switch. A hybrid system in the current context is a system that includes the engine 1 and the motor generators MG1 and MG2 as travel driving force sources and controls the travel motion of the hybrid vehicle HV by implementing various control including control on the operation of the engine 1, control on the powering of the motor generators MG1 and MG2, and collective control for the engine 1 and the motor generators MG1 and MG2.

If the power switch 107 is manually operated by the driver or a passenger, the power switch 107 outputs a signal that corresponds to the manual operation to the ECU 100. The ECU 100 starts or stops the hybrid system based on, for example, the signal output from the power switch 107.

Specifically, if the power switch 107 is manually operated when the hybrid vehicle HV is stationary, the ECU 100 starts up the hybrid system at the P position. This enables the vehicle to become ready for travel motion.

Since the hybrid system is started up at the P position when the hybrid vehicle HV is stationary, no driving force is output even if the accelerator is on. The state of the vehicle being ready for travel motion is a state where the travel motion of the vehicle is controllable through command signals from the ECU 100, and if the driver turns on the accelerator, the hybrid vehicle HV can accelerate from standstill to start traveling (Ready-On state). The Ready-On state includes the state where the hybrid vehicle HV can accelerate from standstill to start traveling by relying on the second motor generator MG2 while the engine 1 is not operating.

The ECU 100 stops the hybrid system if, for example, the power switch 107 is manually operated (e.g., pressed and released quickly) while the vehicle is stationary with the hybrid system running and the shift lever being in the P position.

In the present embodiment, the hybrid system is allowed to stop if the power switch 107 is manually operated (pressed and held down for a moment, for example, 3 seconds) while the hybrid vehicle HV is traveling (while the hybrid system is on). If the power switch 107 is manually operated (to send a restart request) after the hybrid system is manually operated to stop while the vehicle is traveling in this fashion, the hybrid system is allowed to restart in response to the hybrid system restart request. If the hybrid system is started while traveling, a driving force may be output provided that the accelerator is on. This is because the hybrid system is allowed to start with the shift lever being in a non-P position, which differs from the case above where the same procedures are followed when the vehicle is stationary.

ECU

The ECU 100 is an electronic control device that implements the hybrid system described above and includes, for example, a CPU (central processing unit), a ROM (read-only memory), a RAM (random access memory), and a backup RAM.

The ROM stores various control programs as well as maps accessed in executing the control programs The CPU carries out computation based on the control programs and maps stored in the ROM. The RAM is a memory temporarily storing results of CPU computations and sensor data inputs. The backup RAM is a non-volatile memory storing, for example, data that needs to be stored when, for example, when the ignition is turned off.

As illustrated in FIG. 2, the ECU 100 is connected to, for example, an engine rotational speed sensor 101 for detecting the rotational speed (engine rotational speed) of the crankshaft 10 which is the output shaft of the engine 1, a wheel rotational speed sensor 102 for detecting the rotational speed of the wheels (vehicle speed), a throttle opening degree sensor 103 for detecting the opening degree of the throttle valve 13 of the engine 1, an accelerator opening degree sensor 104 for detecting the opening degree of an accelerator pedal 7 (see FIG. 1), a shift lever position sensor 105, the P position switch 106, a power switch 107, a current sensor 108 for detecting charge and discharge currents for the battery 300, a battery temperature sensor 109, and a brake pedal sensor 110 for detecting depression force (brake depression force) acting on the brake pedal. The ECU 100 is also connected to a water temperature sensor detecting engine coolant temperature, an air flow meter detecting an air intake rate, and like sensors registering operating conditions of the engine 1. Signals from these sensors are fed to the ECU 100.

The ECU 100 is also connected to a throttle motor 14, a fuel injection device (injector) 15, and an ignition device 16. The throttle motor 14 opens and closes the throttle valve 13 of the engine 1.

As the hybrid system starts up (Ready-On) in response to a manual operation of the power switch 107, the ECU 100 calculates a required driving force Pr from, for example, an actual accelerator opening degree Acc obtained from an output signal of the accelerator opening degree sensor 104 by using, for example, a map (computation formula). The ECU 100 then controls the driving force sources (the engine 1 and the motor generators MG1 and MG2) to output the required driving force Pr as the target driving force to the drive wheels 6L and 6R. The ECU 100 may in some cases calculate the required driving force Pr from the accelerator opening degree Acc and the vehicle speed V by referring to a map. In some cases, the ECU 100 may calculate the required driving force Pr from a moderated accelerator opening degree $Accs_1$ or $Accs_2$ (which will be described later in detail).

The ECU 100 has a function to manage the shift lever position for the hybrid vehicle HV. Specifically, the ECU 100 switches the shift lever between positions in response to output signals from the shift lever position sensor 105 and the P position switch 106 and may refuse commands for shift lever position switching depending on the conditions of the hybrid vehicle HV.

Furthermore, the ECU 100 computes the SOC (state of charge) of the battery 300 and the input limit Win and the output limit Wout of the battery 300 from the integral value of the charge and discharge currents detected by the current sensor 108, the battery temperature detected by the battery temperature sensor 109, etc. to manage the battery 300.

The inverter 200, connected to the ECU 100, includes IPMs (intelligent power modules) to control the respective motor generators MG1 and MG2. Each IPM is built around a plurality (e.g., 6) of semiconductor switching elements (e.g., IGBTs (insulated gate bipolar transistors)).

The inverter 200 converts a DC current from the battery 300 to electric current for powering the motor generators MG1 and MG2 in response to, for example, command signals from the ECU 100 (e.g., the torque value command for the first motor generator MG1 and the torque value command for the second motor generator MG2). The inverter 200 also converts the AC current generated by the first motor generator MG1 from the power of the engine 1 and the AC current generated by the second motor generator MG2 in regenerative braking to DC current that charges the battery 300. In response to the traveling condition, the inverter 200 may supply the AC current generated by the first motor generator MG1 to power the second motor generator MG2.

Furthermore, the ECU 100 implements the travel mode control and the post-system-stop-while-traveling restart control, both of which are detailed below.

Travel Mode Control

The hybrid vehicle HV in accordance with the present embodiment is powered to run only by the second motor generator MG2 ("EV travel") under conditions, such as during acceleration from standstill or in low speed driving, when the engine 1 has a poor operation efficiency. EV travel is carried out also when the driver selects EV travel mode through a travel mode selection switch located inside the passenger compartment.

In contrast, in normal driving, for example, the power split mechanism 3 splits the power of the engine 1 between two paths (torque split) so that the power on one of the paths directly powers the drive wheels 6L and 6R (direct torque driving) and the power on the other path powers the first motor generator MG1 for power generation. The second motor generator MG2 is powered by the electric power generated by the first motor generator MG1 to assist the powering of the drive wheels 6L and 6R (electric path driving).

The power split mechanism 3 functions as a differential mechanism in the manner described above. The differential action mechanically transmits the majority of the power from the engine 1 to the drive wheels 6L and 6R and electrically transmits the remainder of the power from the engine 1 via the electric path from the first motor generator MG1 to the second motor generator MG2. Thus, the power split mechanism 3 is capable of functioning as a transmission that has an electrically variable gear ratio. That enables the engine rotational speed and the engine torque to be manually and freely changed without relying on the rotational speed and torque of the drive wheels 6L and 6R (ring gears R3 and R4). This arrangement therefore achieves such an operating state of the engine 1 that it can exhibit an optimal fuel consumption rate, and the arrangement is still capable of generating the driving force needed by the drive wheels 6L and 6R.

In high speed driving, additional electric power is fed from the battery (travel-use battery) 300 to the second motor generator MG2 to increase the output of the second motor generator MG2, thereby increasing the driving force for the drive wheels 6L and 6R (driving force assist; motoring).

During deceleration, the second motor generator MG2 functions as an electric power generator for regenerative power generation and stores the recovered power in the battery 300. When the battery 300 has a low charge level and especially needs to be charged, the output of the engine 1 is increased to increase power generation by the first motor generator MG1 and hence increase the charge level of the battery 300. Control to derive an increased driving force from the engine 1 is of course possible in low speed driving if necessary. Some of those instances may include when the battery 300 needs to be charged as mentioned above, when an auxiliary device of, for example, an air conditioner is to be powered, when the temperature of the coolant for the engine 1 is be increased to a predetermined temperature, and when the vehicle is to make an excessively quick acceleration.

Furthermore, in the hybrid vehicle HV of the present embodiment, the engine 1 is stopped to improve fuel economy if the EV travel conditions have been met as evaluated from the operating state of the hybrid vehicle HV, the state of the battery 300, etc. Thereafter, if the EV travel conditions are no longer met, the engine 1 is restarted. As in this example, the engine 1 of the hybrid vehicle HV may run intermittently even if the ignition switch is in the ON position.

Post-System-Stop-While-Traveling Restart Control

Figure 4:
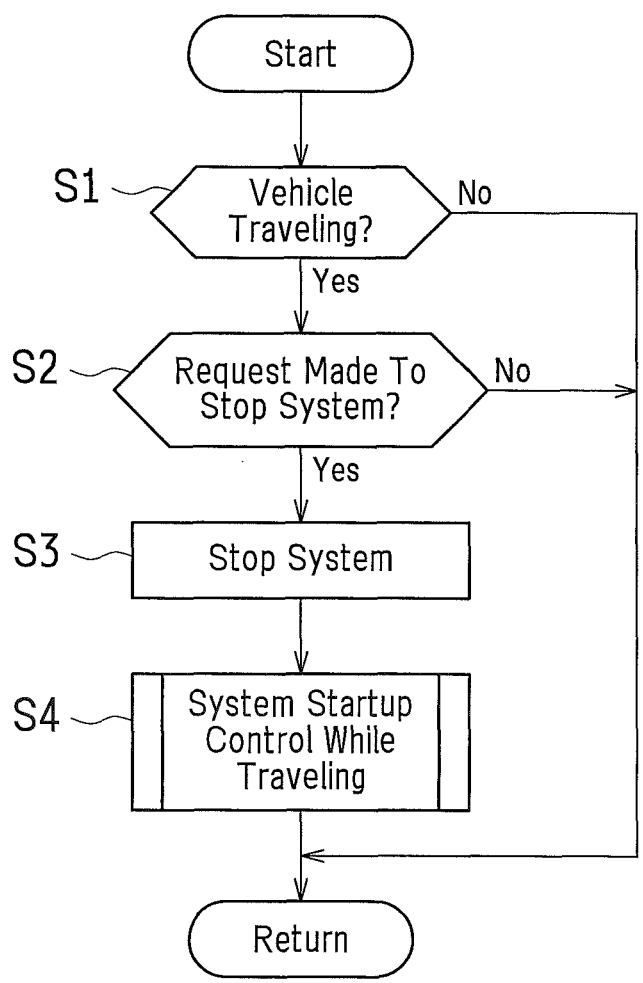
FIG. 4 is a flow chart depicting exemplary control to restart a hybrid system after the hybrid system is manually operated to stop while the vehicle is traveling.
Figure 5:
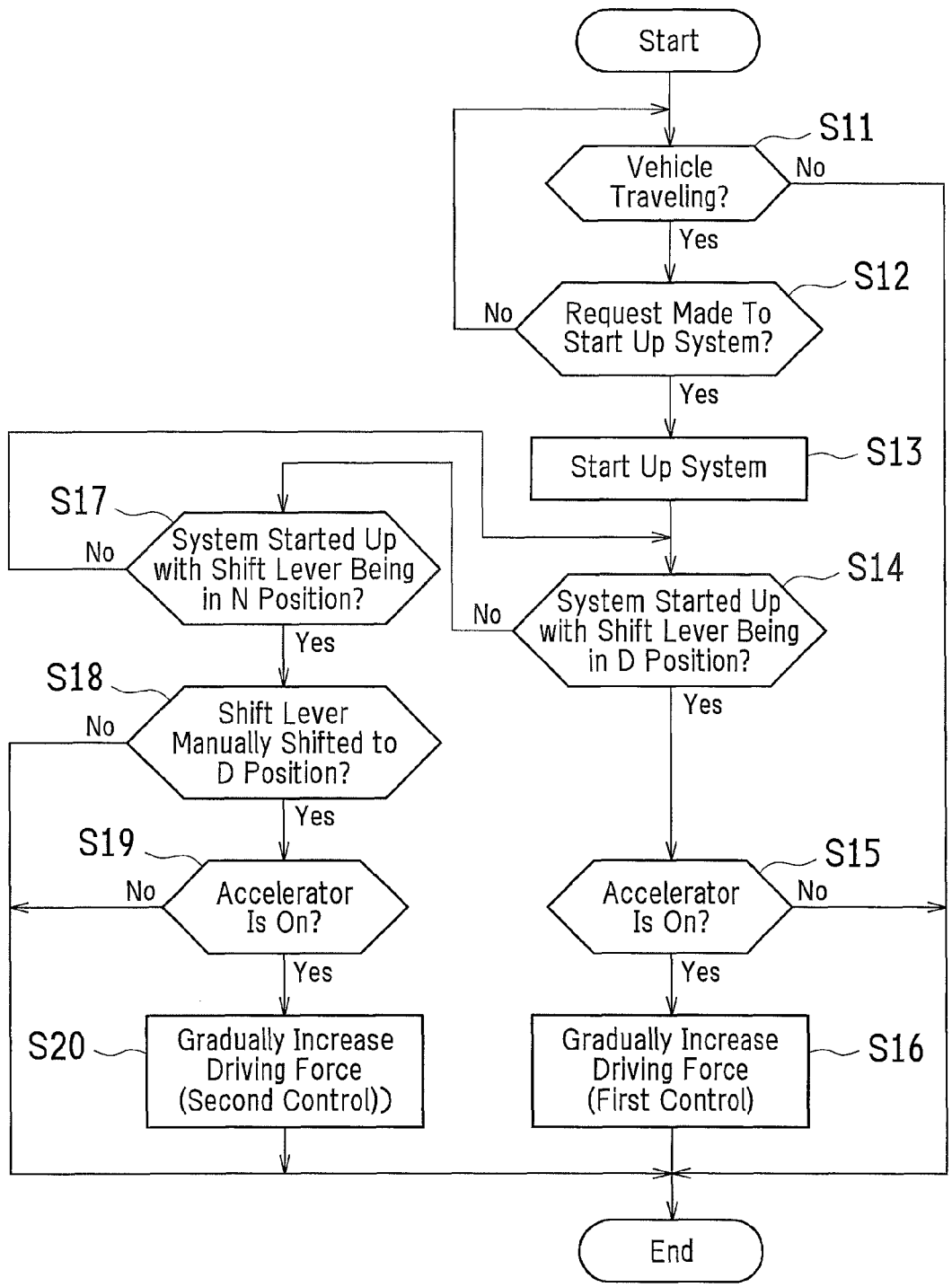
FIG. 5 is a flow chart describing system startup control (while traveling) implemented in step S4 shown in FIG. 4.

Referring to FIGS. 4 and 5, an example will be described of control implemented in response to a restart request that is made after the hybrid system is stopped while traveling (post-system-stop-while-traveling restart control). All the following steps are carried out by the ECU 100.

First, in step S1 of FIG. 4, it is determined from the vehicle speed V calculated from the output signal of the wheel rotational speed sensor 102 whether or not the hybrid vehicle HV is traveling. If the hybrid vehicle HV is determined to be traveling, the control process proceeds to step S2. On the other hand, if the hybrid vehicle HV is determined not to be traveling, the control process proceeds to "Return."

In step S2, it is determined from the output signal of the power switch 107 whether or not there has been made a manual request to stop the hybrid system (e.g., the power switch 107 has been pressed and held down for a moment). If it is determined that there has been made a manual request to stop the hybrid system, the control process proceeds to step S3. On the other hand, if it is determined that there has not been made a manual request to stop the hybrid system, the control process proceeds to "Return."

In step S3, the hybrid system is stopped. This step of stopping the hybrid system involves, for example, stopping the engine 1 by cutting out the fuel, stopping powering the motor generators MG1 and MG2 by closing the gate to the inverter 200, and opening the system main relay. The system main relay is provided to connect and disconnect the battery 300 and the inverter 200.

In step S4, system startup control (while traveling) is implemented. After this system startup control (while traveling) ends, the control process proceeds to "Return."

In the system startup control (while traveling), first, in step S11 of FIG. 5, it is determined from the vehicle speed V calculated from the output signal of the wheel rotational speed sensor 102 whether or not the hybrid vehicle HV is traveling. If the hybrid vehicle HV is determined to be traveling, the control process proceeds to step S12. On the other hand, if the hybrid vehicle HV is determined not to be traveling, the control process proceeds to "End" because the vehicle, having lost its inertia, is stationary and needs no system startup (while traveling).

In step S12, it is determined from the output signal of the power switch 107 whether or not there has been made a manual request to start up the hybrid system (e.g., the power switch 107 has been pressed and released quickly). If it is determined that there has been made a manual request to start up the hybrid system, the control process proceeds to step S13. On the other hand, if it is determined that there has not been made a manual request to start up the hybrid system, the control process returns to step S11.

In step S13, the hybrid system is restarted to return the hybrid vehicle HV to a state where it is ready to travel (Ready-On state). Specifically, the system is checked. After the system check is completed, the system main relay is closed to render the motor generators MG1 and MG2 ready to be powered. If the EV travel conditions have not yet met, the engine 1 is started to render the drive wheels 6L and 6R ready to be fed with a driving force.

In step S14, it is determined whether or not the hybrid system has been restarted with the shift lever being in the D position (travel position). The shift lever position upon restarting the hybrid system is, for example, the same as the shift lever position in step S3 where the hybrid system is stopped. If the hybrid system is determined to have restarted with the shift lever being in the D position, the control process proceeds to step S15. On the other hand, if the hybrid system is determined to have restarted with the shift lever being in a non-D position, the control process proceeds to step S17.

In step S15, it is determined from the output signal of the accelerator opening degree sensor 104 whether or not the accelerator pedal 7 is being depressed by the driver (whether or not the accelerator is on). If the accelerator pedal 7 is determined to be being depressed, the control process proceeds to step S16. On the other hand, if the accelerator pedal 7 is determined not to be being depressed, the control process proceeds to "End," without supplying driving force to the drive wheels 6L and 6R. In step S15, the accelerator pedal 7 may have been depressed by the driver since before the startup of the hybrid system is started or since the startup of the hybrid system is completed.

In step S16, because the accelerator was on when the hybrid system was restarted with the shift lever being in the D position, the first control is implemented in which the driving force output to the drive wheels 6L and 6R is gradually increased.

Figure 6:
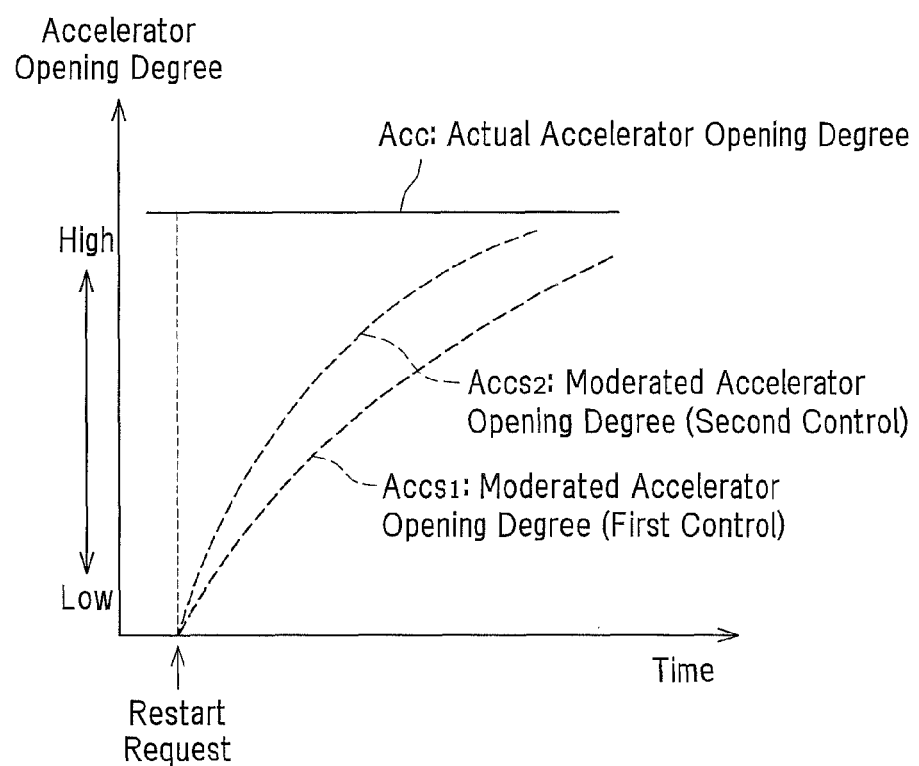
FIG. 6 is a diagram representing a set of exemplary moderated accelerator opening degrees for use upon restarting the hybrid system.

Specifically, as illustrated in FIG. 6, the actual accelerator opening degree Acc is subjected to a moderation process according to equation (1) below to calculate a moderated accelerator opening degree $Accs_1$. A driving force, $Prs_1$, required upon restarting (moderated required driving force) is calculated from the calculated moderated accelerator opening degree $Accs_1$. The driving force sources (the engine 1 and the motor generators MG1 and MG2) are controlled to gradually increase the driving force output to the drive wheels 6L and 6R (the driving force output of the hybrid system), with the driving force, $Prs_1$, required upon restart being the target driving force.

$$Accs_1(i)=Accs_1(i-1)+(Acc(i)-Accs_1(i-1))/K_1 \qquad (1)$$

where Acc(i) is the actual accelerator opening degree (a constant in the example shown in FIG. 6), $Accs_1(i-1)$ is a previously moderated accelerator opening degree, and $K_1$ is a moderation coefficient for the first control. The greater the moderation coefficient $K_1$, the less smoothing effect the moderated accelerator opening degree $Accs_1$ produces, that is, the smaller the rate of increase of the required driving force (travel driving force or driving force). Equation (1) is applied repeatedly at very short intervals (e.g., few microseconds).

In this arrangement, if the accelerator is on when the hybrid system is to be restarted with the shift lever being in the D position after the hybrid system is manually operated to stop while the hybrid vehicle HV is traveling, the first control is implemented to supply a gradually increasing driving force to the drive wheels 6L and 6R without supplying the driving force Pr per se that corresponds to the accelerator opening degree Acc. Therefore, the arrangement is capable of restraining degrading drivability upon restoring driving force.

In step S17 of FIG. 5, it is determined whether or not the hybrid system has been restarted with the shift lever being in the N position. If the hybrid system is determined to have restarted with the shift lever being in the N position, the control process proceeds to step S18. On the other hand, if the hybrid system is determined not to have restarted with the shift lever being in the N position, the control process returns to step S14.

In step S18, it is determined from the output signal of the shift lever position sensor 105 whether or not the shift lever has been manually shifted to the D position. If the shift lever is determined to have been manually shifted to the D position, the control process proceeds to step S19. On the other hand, if the shift lever is determined not to have been manually shifted to the D position, the control process proceeds to "End," without supplying driving force to the drive wheels 6L and 6R.

In step S19, it is determined from the output signal of the accelerator opening degree sensor 104 whether or not the accelerator pedal 7 is being depressed by the driver (whether or not the accelerator is on). If the accelerator pedal 7 is determined to be being depressed, the control process proceeds to step S20. On the other hand, if the accelerator pedal 7 is determined not to be being depressed, the control process proceeds to "End," without supplying driving force to the drive wheels 6L and 6R. In step S19, the accelerator pedal 7 may have been depressed by the driver since before the manual shift (since before the startup of the hybrid system is started and after the startup of the hybrid system is completed) or since the manual shift.

In step S20, because the accelerator was on when the hybrid system was restarted with the shift lever being in the N position and shifted to the D position, the second control is implemented in which the driving force output to the drive wheels 6L and 6R is gradually increased. The driving force increases at a greater rate of increase in step S20 of the second control than in step S16 of the first control.

Specifically, as illustrated in FIG. 6, the actual accelerator opening degree Ace is subjected to a moderation process according to equation (2) below to calculate a moderated accelerator opening degree $Accs_2$. A driving force, $Prs_2$, required upon restarting (moderated required driving force) is calculated from the calculated moderated accelerator opening degree $Accs_2$. The driving force sources (the engine 1 and the motor generators MG1 and MG2) are controlled to gradually increase the driving force output to the drive wheels 6L and 6R (the driving force output of the hybrid system), with the driving force, $Prs_2$, required upon restart being the target driving force.

$$Accs_2(i)=Accs2(i-1)+(Acc(i)-Accs_2(i-1))/K_2 \quad (2)$$

where Acc(i) is the actual accelerator opening degree (a constant in the example shown in FIG. 6), $Accs_2(i-1)$ is a previously moderated accelerator opening degree, and $K_2$ is a moderation coefficient for the second control, which is smaller than the moderation coefficient $K_1$ for the first control. Equation (2) is applied repeatedly at very short intervals (e.g., few microseconds).

In this arrangement, if the accelerator is on upon switching to the D position following restarting of the hybrid system from the N position after the hybrid system is manually operated to stop while the hybrid vehicle HV is traveling, since it is likely that the driver is intending to increase the driving force, the second control is implemented to supply to the drive wheels 6L and 6R a driving force that increases gradually, but at a greater rate of increase than in the first control. The arrangement is hence capable of readily restoring driving force while restraining degrading drivability upon restoring driving force.

As described in the foregoing, in the present embodiment, if the driver or a passenger manually operates (turns off) the power switch 107 while the hybrid vehicle HV is traveling, the hybrid system stops running. That loses the driving force output from the engine 1 and the motor generators MG1 and MG2 (driving force sources) to the drive wheels 6L and 6R. The driver can respond by depressing the accelerator pedal 7 to restore driving force. In this state, if the driver notices that he/she has made a mistake in the manual operation of the power switch 107 and manually operates the power switch 107 (sends a restart request) (when the accelerator is on), the present embodiment is capable of restraining degrading drivability by preventing the driving force from being excessively quickly generated (driving force from being excessively quickly restored) even if the shift lever is in the D position upon restarting. Meanwhile, if the shift lever is in the N position upon restarting, and the accelerator is on upon switching to the D position, since it is likely that the driver is intending to increase the driving force, the present embodiment is capable of readily restoring driving force in accordance with the intention of the driver while restrain degrading drivability by increasing the rate of increase of the driving force in comparison with when the accelerator is on upon restarting with the shift lever being in the D position.

The moderation coefficients $K_1$ and $K_2$ with which the actual accelerator opening degree Acc is moderated in the present embodiment may be constants or variables that vary with the actual accelerator opening degree Acc (details will be given later).

In the present embodiment, if the accelerator is on when the hybrid system is restarted with the shift lever being in the D position after the hybrid system is manually operated to stop while the vehicle is while traveling, the first control may not be implemented because, for example, there is little possibility of degrading drivability due to a low accelerator opening degree.

In the present embodiment, the first control may be implemented only if the accelerator pedal 7 is being depressed by the driver when the hybrid system is stopped while the vehicle is traveling. When this is the case, the depression level of the accelerator pedal 7 may be detected when the hybrid system is stopping and when it is restarted, so that the moderation process may be carried out in accordance with the difference between the depression levels detected.

The moderation process may be carried out for a predetermined duration T1 in the first control and the second control in the present embodiment. When this is the case, the driving force may be increased by large amounts after the duration T1 has elapsed, so as to generate required driving force Pr within a duration T2 (that is longer than duration T1).

The first control and the second control have so far assumingly involved a moderation process as an example in the present embodiment. This is by no means intended to be limiting the invention. Alternatively, the first control and the second control may involve a different moderately changing process, such as rate adjusting, to gradually increase the driving force output of the driving force source.

The driving force output may be less than or equal to a predetermined value in the first control and the second control in the present embodiment. The predetermined value is smaller than the required driving force Pr and may be either a constant or a variable. For example, the predetermined value may be calculated from the depression level of the accelerator pedal 7.

The second control has so far assumingly involved a moderation process as an example in the present embodiment. This is by no means intended to be limiting the invention. Alternatively, the second control may not involve any moderation process. In other words, the rate of increase of the driving force output in the second control may be equal to the rate of increase of the ordinary driving force output (the non-moderated driving force output as dictated by the depression level of the accelerator pedal 7).

The first control and the second control have so far assumingly applied the moderation process to the accelerator opening degree Acc as an example in the present embodiment. This is by no means intended to be limiting the invention. Alternatively, the moderation process may be applied to a required total output (required driving force Pr) from the engine 1 and the motor generators MG1 and MG2 to the drive wheels 6L and 6R (drive shafts 61). Further alternatively, the moderation process may be applied to the required output for the second motor generator MG2. Furthermore, the driving force output to the drive wheels 6L and 6R may be gradually increased by controlling the clutch, automatic transmission, or any other part of the driving force transmission system.

The second control may be implemented in the present embodiment if the accelerator is on upon switching from the N position to the D position while the vehicle is traveling in the Ready-On state (not upon restarting the hybrid system, but during normal driving).

The first control has so far been assumingly implemented, as an example, in the present embodiment if the accelerator is on when the hybrid system is restarted from the D position. This is by no means intended to be limiting the invention. Alternatively, the first control may be implemented if the accelerator is on when the hybrid system is restarted from the B position. In other words, the travel position for the present invention may not be the D position.

In addition, in the present embodiment, the shift lever position when the hybrid system is restarted has so far been assumingly specified according to the settings as they are when the hybrid system is stopped. This is by no means intended to be limiting the invention. The shift lever position upon restarting the hybrid system may be specified according to the position of the shift lever 81 upon restarting.

In step S18 of the present embodiment, if the shift lever is determined not to have been manually shifted to the D position, it may be determined repeatedly whether or not the shift lever has been manually shifted to the D position either for a predetermined period or until the inertia travel ends; if the shift lever is determined to have been manually shifted to the D position, the control process may proceed to step S19.

Variation Example 1

Next, a variation example of embodiment 1 will be described.

This example is characterized in that the moderation coefficients $K_1$ and $K_2$ are variables that vary with the actual accelerator opening degree Acc at the time of restarting the hybrid system. A specific example is given now.

First, a high actual accelerator opening degree Acc leads to an excessively quick increase in driving force when compared with a small actual accelerator opening degree Acc. Therefore, a high actual accelerator opening degree Acc tends to result in drivability being seriously degraded. Taking this into account, in the present example, the moderation coefficients $K_1$ and $K_2$ for the moderation processes (in equations (1) and (2)) are increased when the actual accelerator opening degree Acc has a large value in comparison with when the actual accelerator opening degree Acc has a small value. These settings restrain degrading drivability more effectively for high accelerator depression levels upon receiving a request to restart the hybrid system. In that case, the moderation coefficients $K_1$ and $K_2$ for the moderation processes (in equations (1) and (2)) may be set to increasingly large values for high actual accelerator opening degrees Acc.

Variation Example 2

Another variation example of embodiment 1 will be described.

This example is characterized in that if the accelerator is manually turned on/off repeatedly, the rate of increase (of the driving force) at which the driving force (driving force output to the drive wheels 6L and 6R) is increased is gradually increased every time the accelerator is manually turned on.

Figure 7:
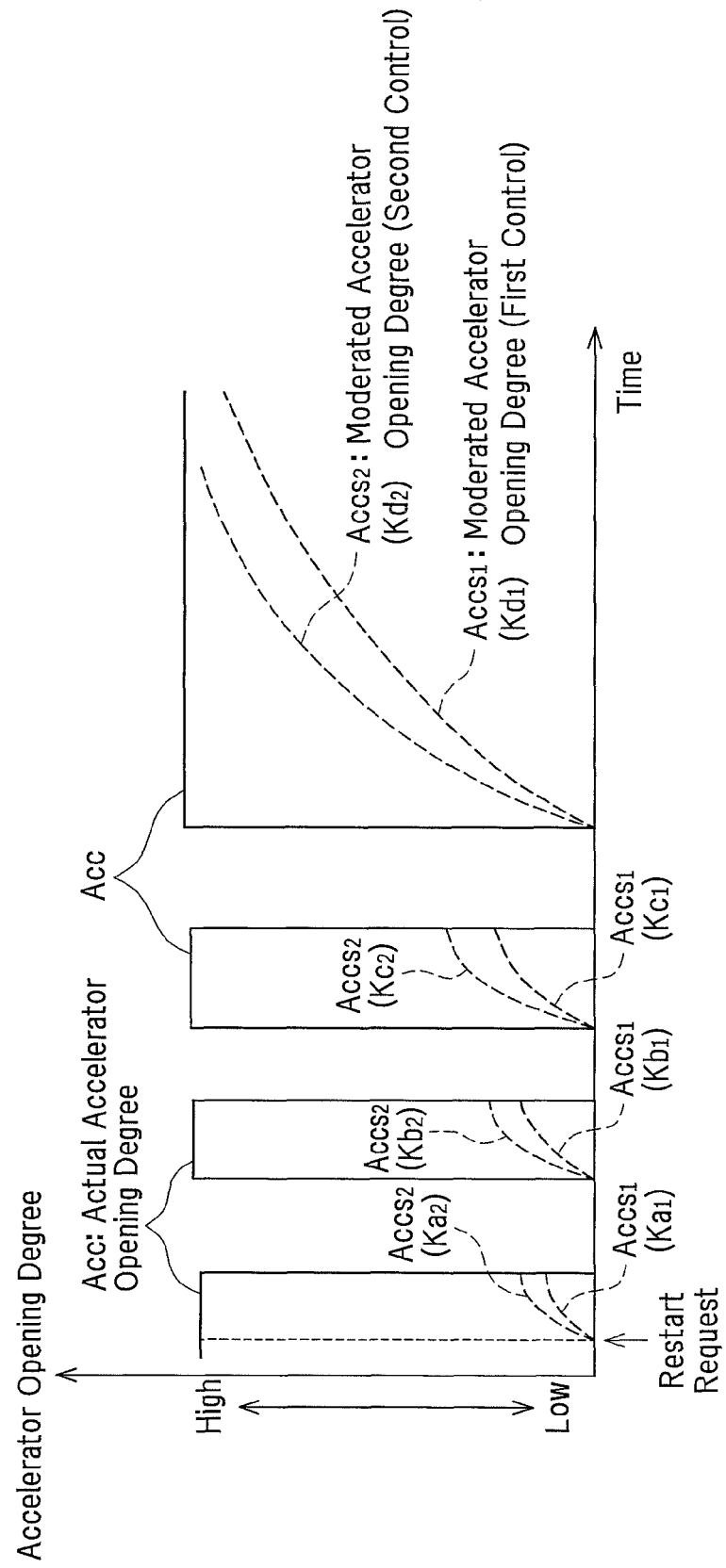
FIG. 7 is a diagram representing another set of exemplary moderated accelerator opening degree for use upon restarting the hybrid system.

Specifically, as illustrated in FIG. 7, if the accelerator is manually turned on/off, for example, 3 times while the first control is being implemented, the moderation coefficient $Ka_1$ used to calculate the moderated accelerator opening degree $Accs_1$ is set to a maximum value. Thereafter, the moderation coefficients $Kb_1$, $Kc_1$, and $Kd_1$ are controlled to sequentially decrease every time the accelerator is manually turned on. Similarly, if the accelerator is manually turned on/off, for example, 3 times while the second control is being implemented, the moderation coefficient $Ka_2$ (which is smaller than the moderation coefficient Kai) used to calculate the moderated accelerator opening degree $Accs_2$ is set to a maximum value. Thereafter, the moderation coefficient $Kb_2$ (which is smaller than the moderation coefficient $Kb_1$), $Kc_2$ (which is smaller than the moderation coefficient $Kc_1$), and $Kd_2$ (which is smaller than the moderation coefficient $Kd_1$) are controlled to sequentially decrease every time the accelerator is manually turned on. This control is capable of gradually increasing the rate of increase of driving force (driving force output to the drive wheels 6L and 6R) as the accelerator is manually turned on more frequently. The control therefore is capable of smoothly increasing driving force, hence restraining degrading drivability, even if the accelerator is manually turned on/off repeatedly after receiving a request to restart the hybrid system.

Embodiment 2

Embodiment 1 above described examples where the present invention was applied to a hybrid vehicle HV equipped with the two motor generators MG1 and MG2. This is not limiting the present invention. Alternatively, the invention is applicable to hybrid vehicles equipped with a single motor generator. An example will be described in reference to FIG. 8.

This exemplary vehicle is an FR (front engine & rear drive) hybrid vehicle 400. The vehicle includes, for example, an engine 401, a motor generator (MG) 403, a transmission (e.g. an automatic stepped transmission or a continuously variable transmission) 405, an inverter 411 for powering the motor generator 403, a battery 412, and an ECU 410. The battery 412 supplies electric power that powers the motor generator 403 and stores the electric power generated by the motor generator 403. The engine 401 and the motor generator 403 are coupled via a first clutch 402. The motor generator 403 and the transmission 405 are coupled via a second clutch 404.

Figure 8:
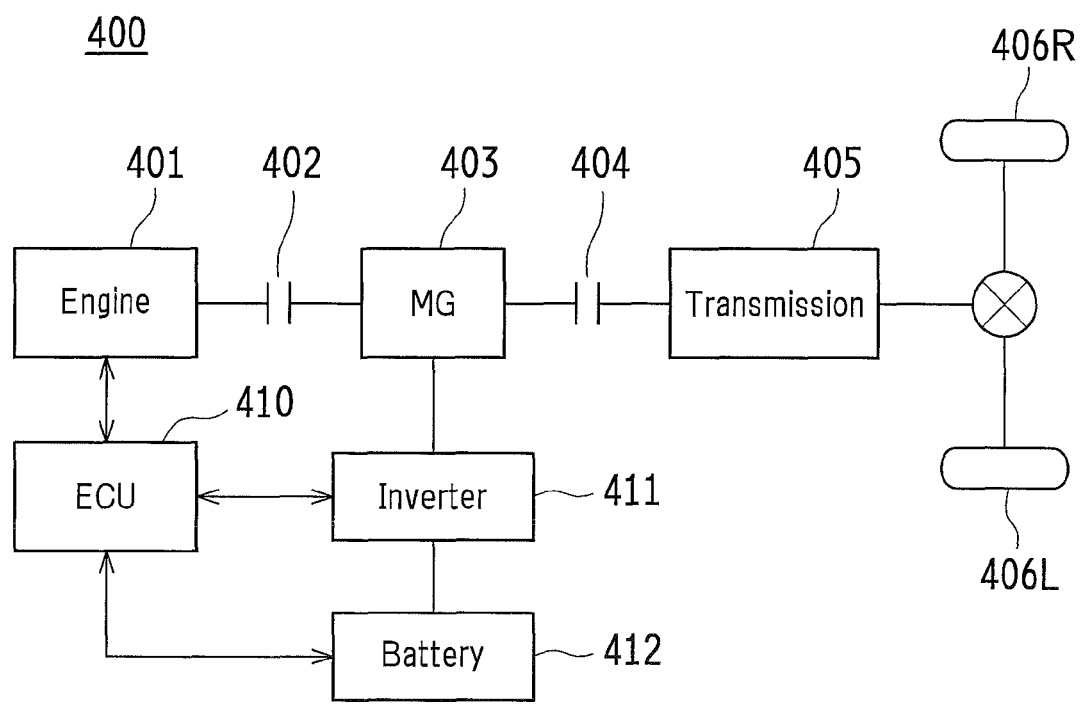
FIG. 8 is a schematic illustration of another exemplary vehicle to which the present invention is applicable.

In the hybrid vehicle 400 shown in FIG. 8, the motor generator 403 alone is capable of powering the drive wheels (rear wheels) 406L and 406R by disengaging (releasing) the first clutch 402 and engaging (connecting) the second clutch 404.

By engaging (connecting) both the first clutch 402 and the second clutch 404, the driving force from the engine 401 is capable of powering the drive wheels 406L and 406R, and the motor generator 403 is capable of generating electric charge or assist torque. The hybrid vehicle 400 of the present example has a power switch for turning on/off the hybrid system (engine 401, motor generator 403), or a driving force source. The hybrid vehicle 400 is capable of switching to neutral mode for neutral driving and drive mode for forward travel.

Similarly to embodiment 1 above, the present embodiment, upon restarting the system after the system is stopped while traveling, restrains degrading drivability upon restoring driving force by implementing the first control and the second control. The first control and the second control are implemented by the ECU 410 similarly to embodiment 1 above.

Embodiment 3

Figure 9:
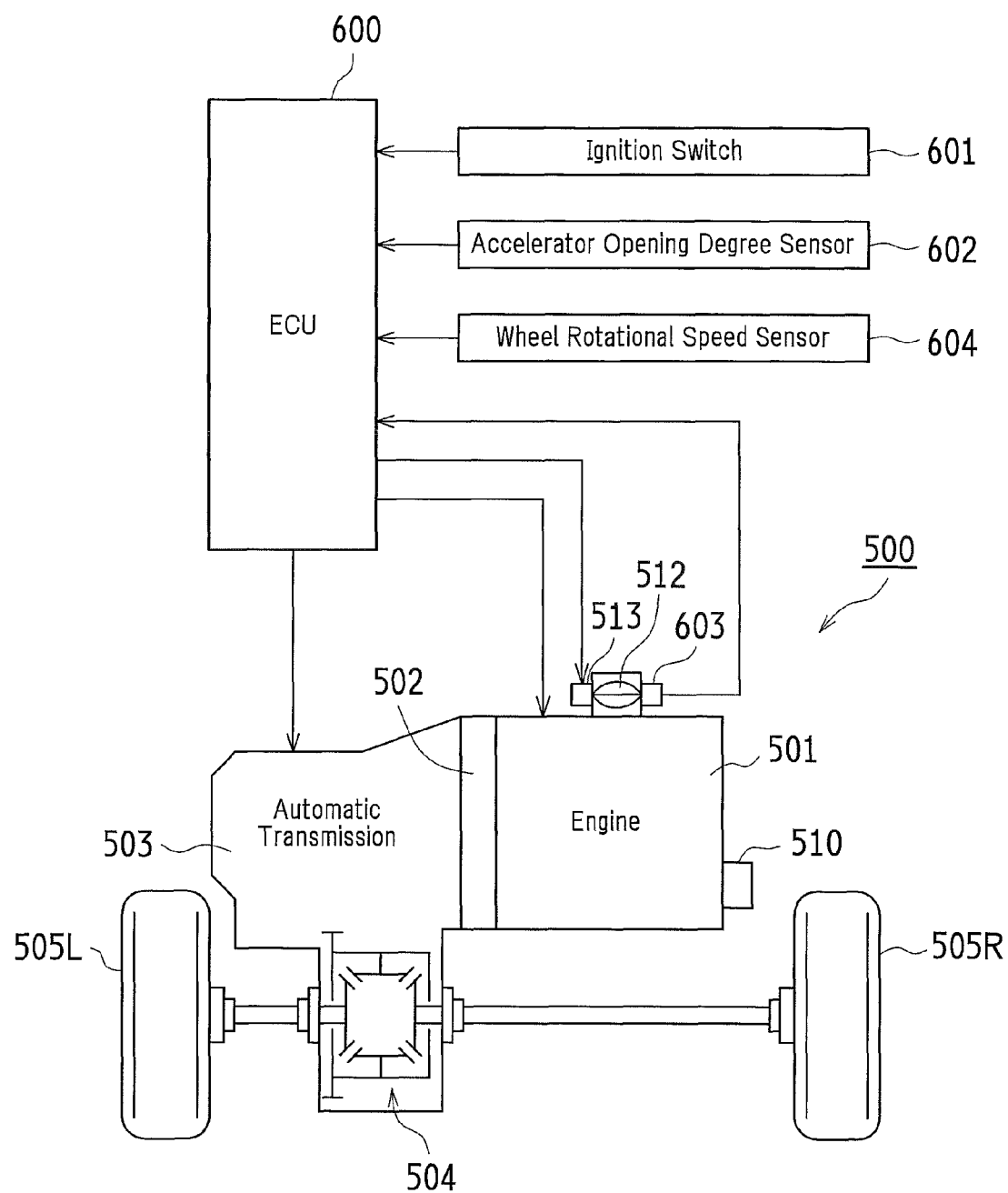
FIG. 9 is a schematic illustration of a further exemplary vehicle to which the present invention is applicable.

FIG. 9 is a schematic illustration of a further exemplary vehicle to which the present invention is applicable.

This exemplary vehicle is a conventional FF vehicle 500. The vehicle 500 includes, for example, an engine (internal combustion engine), or a driving power source, 501, a torque converter 502, an automatic transmission 503, a differential device 504, and an ECU 600.

The engine 501 has its crankshaft (output shaft) coupled to the torque converter 502 so that the output of the engine 501 can be transmitted to the differential device 504 via, for example, the torque converter 502 and the automatic transmission 503 and then distributed between the left and right drive wheels 505L and 505R.

The engine 501 of this example is another publicly known power generating apparatus (internal combustion engine), such as a gasoline engine or a diesel engine, that combusts fuel for power output. The engine 501 is so structured that it can control the throttle opening degree (air intake rate) of a throttle valve 512 disposed on an air intake path, a fuel injection rate, an ignition period, and other operating conditions. Following combustion, exhaust gas flows through an exhaust path (not shown) for purification with oxidation catalyst (not shown) before being discharged to open air.

The crankshaft of the engine 501 is coupled to a starter motor 510 so that the starter motor 510 can carry out cranking (motoring) upon start of the engine 501.

The automatic transmission 503 is an automatic stepped transmission that provides gears by using, for example, frictionally engaging components, such as a clutch and a brake, and planetary gear. The automatic transmission may be another kind of transmission, such as a belt-based continuously variable transmission.

The ECU 600 is connected to, for example, an ignition switch 601, an accelerator opening degree sensor 602 for detecting the opening degree of the accelerator pedal, a wheel rotational speed sensor 604 for detecting the rotational speed of the wheels (vehicle speed), various sensors, including a throttle opening degree sensor 603, registering operating conditions (e.g., engine rotational speed, engine water temperature, air intake rate, and intake air temperature) of the engine 501, and a shift lever position sensor detecting the shift lever position of the automatic transmission 503.

The ECU 600 controls the driving force of the engine 501. Specifically, a required driving force Pe is calculated for the engine 501 from the actual accelerator opening degree Acc obtained from the output signal from the accelerator opening degree sensor 602 by using, for example, a map (computation formula). The driving force of the engine, or driving force source, 501 (the driving force output to the drive wheels 505L and 505R) is controlled using the required driving force Pe as the target driving force. The required driving force Pe may be in some cases calculated from the accelerator opening degree Acc and the vehicle speed V according to, for example, a map. The required driving force Pe may also be calculated from the moderated accelerator opening degree $Accs_1$ or $Accs_2$ similarly to embodiment 1.

In the present embodiment, if the ignition switch 601 is manually operated for IG-Off while the conventional vehicle 500 is traveling, the engine 501 is stopped. Furthermore, if an engine restart request is sent by manually operating the ignition switch 601 (IG-Off→IG-On) after the engine 501 is manually operated to stop while the vehicle 501 is traveling, the engine 501 is capable of restarting in response to the engine restart request. The conventional vehicle 500 is capable of switching to neutral mode for neutral driving and drive mode for forward travel.

Post-IG-Off-While-Traveling Restart Control

In reference to FIGS. 10 and 11, an example will be described of control implemented in response to a restart request that is made after the engine is stopped while traveling (post-IG-Off-while-traveling restart control). The following steps are carried out by the ECU 600.

Figure 10:
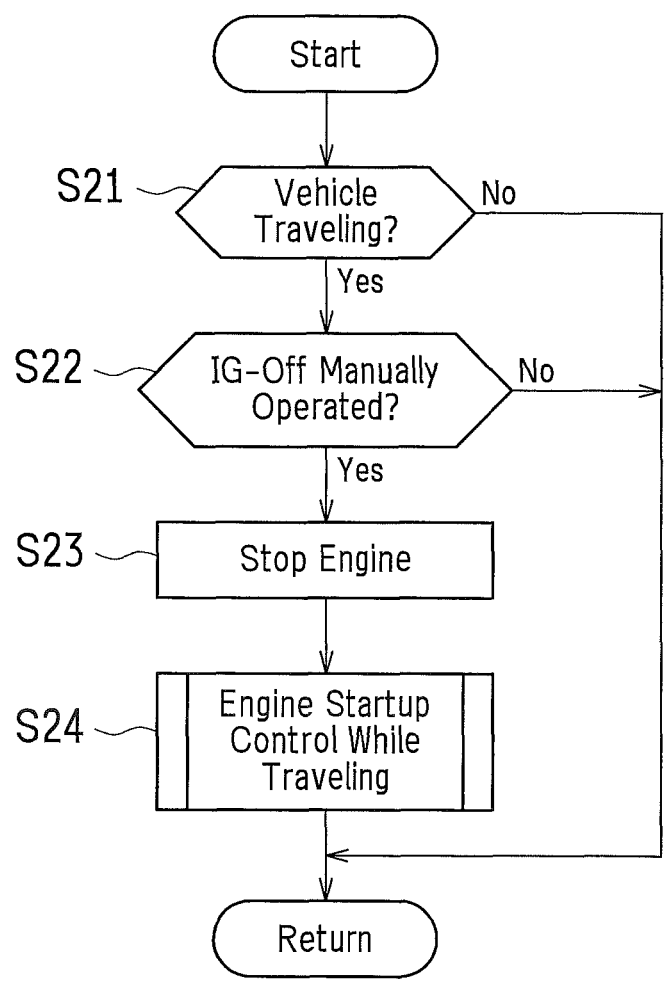
FIG. 10 is a flow chart depicting exemplary control implemented upon restarting the engine after the engine is manually operated to stop while the vehicle is traveling.

First, in step S21 of FIG. 10, it is determined from the vehicle speed V calculated from the output signal of the wheel rotational speed sensor 604 whether or not the conventional vehicle 500 is traveling. If the conventional vehicle 500 is determined to be traveling, the control process proceeds to step S22. On the other hand, if the conventional vehicle 500 is determined not to be traveling, the control process proceeds to "Return."

In step S22, it is determined from the output signal of the ignition switch 601 whether or not there has been a manual IG-Off request. If it is determined that there has been made a manual IG-Off request, the control process proceeds to step S23. On the other hand, if it is determined that there has not been made a manual IG-Off request, the control process proceeds to "Return."

Then, in step S23, the engine 501 is stopped by, for example, cutting out the fuel.

In step S24, control is implemented to start the engine while traveling ("engine-start-while-traveling control"). After the engine-start-while-traveling control ends, the control process proceeds to "Return."

Figure 11:
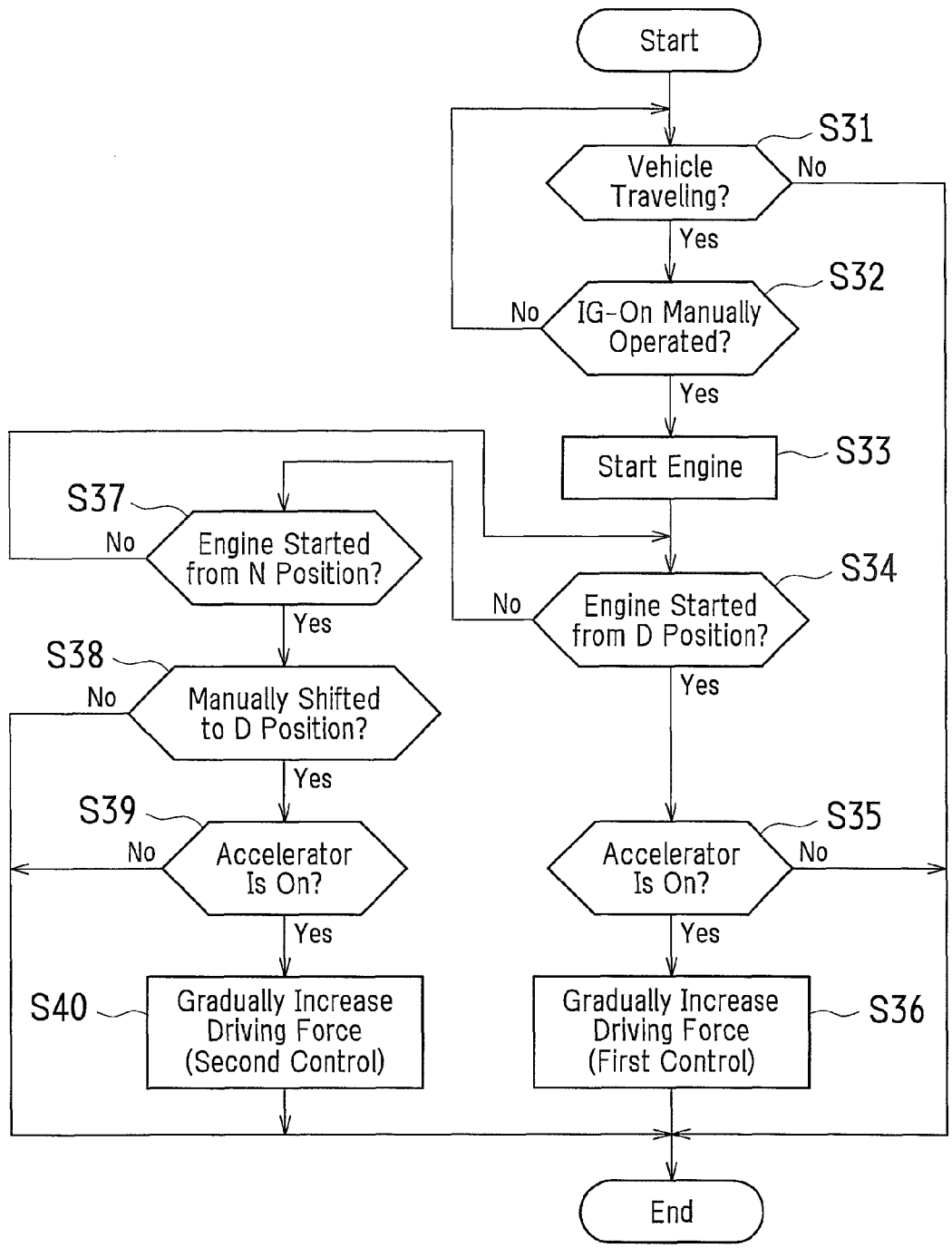
FIG. 11 is flow chart describing control implemented upon an engine startup while traveling in step S24 shown in FIG. 10.

In this engine-start-while-traveling control, first, in step S31 of FIG. 11, it is determined from the vehicle speed V calculated from the output signal of the wheel rotational speed sensor 604 whether or not the conventional vehicle 500 is traveling. If the conventional vehicle 500 is determined to be traveling, the control process proceeds to step S32. On the other hand, if the conventional vehicle 500 is determined not to be traveling, the control process proceeds to "End" because the conventional vehicle 500, having lost its inertia, is stationary and needs no engine startup (while traveling).

In step S32, it is determined from the output signal of the ignition switch 601 whether or not there has been made a manual IG-On request. If it is determined that there has been made a manual IG-On request, the control process proceeds to step S33. On the other hand, if it is determined that there has not been made a manual IG-On request, the control process returns to step S31.

In step S33, the engine 501 is restarted. Specifically, the engine 501 is restarted by powering the starter motor 510 to carry out cranking of the engine 501.

Then, in step S34, it is determined whether or not the engine 501 has been restarted with the shift lever being in the D position. If the engine 501 is determined to have restarted with the shift lever being in the D position, the control process proceeds to step S35. On the other hand, if the engine 501 is determined to have restarted with the shift lever being in a non-D position, the control process proceeds to step S37.

Next, in step S35, it is determined from the output signal of the accelerator opening degree sensor 602 whether or not the accelerator pedal is being depressed by the driver (whether or not the accelerator is on). If the accelerator pedal is determined to be being depressed, the control process proceeds to step S36. On the other hand, if the accelerator pedal is determined not to be being depressed, the control process proceeds to "End," without supplying driving force to the drive wheels 505L and 505R. In step S35, the accelerator pedal may have been depressed by the driver since before the restart of the engine 501 or since the restart of the engine 501.

In step S36, because the accelerator was on when the engine 501 was restarted with the shift lever being in the D position, the first control is implemented in which the driving force output to the drive wheels 505L and 505R is gradually increased. This arrangement is capable of restraining excessively quick generation of driving force (driving force is restored), hence restraining degrading drivability. Specifically, the actual accelerator opening degree Acc is subjected to a moderation process according to equation (1) above.

In step S37, it is determined whether or not the engine 501 has been restarted with the shift lever being in the N position. If the engine 501 is determined to have been restarted with the shift lever being in the N position, the control process proceeds to step S38. On the other hand, if the engine 501 is determined to have been restarted with the shift lever being in a non-N position, the control process returns to step S34.

In step S38, it is determined whether or not the shift lever has been manually shifted from the N position to the D position. If the shift lever is determined to have been manually shifted to the D position, the control process proceeds to step S39. On the other hand, if the shift lever is determined not to have been manually shifted to the D position, the control process proceeds to "End," without supplying driving force to the drive wheels 505L and 505R.

In step S39, it is determined from the output signal of the accelerator opening degree sensor 602 whether or not the accelerator pedal is being depressed by the driver (whether or not the accelerator is on). If the accelerator pedal is determined to be being depressed, the control process proceeds to step S40. On the other hand, if the accelerator pedal is determined not to be being depressed, the control process proceeds to "End," without supplying driving force to the drive wheels 505L and 505R. In step S39, the accelerator pedal may have been depressed by the driver since before the manual shift (since before the engine 501 was started and after the engine 501 was restarted) or since the manual shift.

In step S40, because the accelerator was on when the engine 501 was restarted with the shift lever being in the N position and shifted to the D position, the second control is implemented in which the driving force output to the drive wheels 505L and 505R is gradually increased. The driving force increases at a greater rate of increase in step S40 of the second control than in step S36 of the first control. Specifically, the actual accelerator opening degree Acc is subjected to a moderation process according to equation (2) above.

The present embodiment has similar effects to the effects of embodiment 1. In addition, variation example 1 and variation example 2 of embodiment 1 are applicable to the present embodiment.

As an example, in a conventional vehicle in which the engine automatically stops and automatically starts, the moderation coefficient of the present embodiment may be different from the moderation coefficient that is for use to gradually increase the driving force if the engine automatically starts based on the depression level of the accelerator pedal when the engine automatically stops than if the engine automatically starts based on other conditions. In other words, in the present embodiment, since the driving force increases in response to the power switch (ignition switch) being pressed with the accelerator pedal being depressed, the driving force starts to increase roughly when the driver wants it to increase. The driving force is controlled to gradual increase to restrain degrading drivability that is caused by the power switch being pressed with the accelerator pedal being depressed. In contrast, the vehicle in which the engine has automatically stopped has problems that although the driver depressing the accelerator pedal or releasing the brake pedal (creep torque request) is an indication of his/her intention to start increasing driving force, the driving force actually increases rather slowly. The driving force may be controlled to gradually increase to address these problems. The moderation coefficient may be set to differing suitable values to address these individual problems.

In a conventional vehicle in which the engine automatically stops and automatically starts, the moderation coefficient of the present embodiment may be equal to the moderation coefficient that is for use to gradually increase the driving force if the engine automatically starts based on the depression level of the accelerator pedal when the engine automatically stops than if the engine automatically starts based on other conditions. This arrangement allows for simple and convenient control.

Other Embodiments

Embodiment 1 above presented examples where the power switch, or the momentary-type push button switch, 107 was used as a manual operation unit for manually start and stop the hybrid system. The present invention is by no means limited to these examples. The manual operation unit may have any other structure, for example, a lever switch, a slide switch, or a key switch in which a key is inserted and rotated in a cylinder, provided that it can handle manual operations.

Embodiment 1 above presented examples where the present invention was applied to an FF hybrid vehicle HV. This is by no means intended to be limiting the invention. Alternatively, the present invention may be applied to FR or 4WD hybrid vehicles.

Embodiment 1 above presented examples where the present invention was applied to a "split-scheme" hybrid vehicle HV including the two motor generators MG1 and MG2 and a power split mechanism 3. This is by no means intended to be limiting the invention. Alternatively, the present invention may be applied to "series-scheme" or "parallel-scheme" hybrid vehicles. In a series-scheme hybrid vehicle, the engine is used solely to power an electric power generator for electric power generation, and the drive wheels are powered solely by the motor. The drive wheels are powered by both the engine and the motor in a parallel-scheme hybrid vehicle.

Embodiment 1 above presented examples where the power switch 107 was pressed and held down for a moment to manually stop the hybrid system of the traveling hybrid vehicle HV. This is by no means intended to be limiting the invention. Alternatively, the power switch 107 may be pressed and released quickly to manually stop the hybrid system of the traveling hybrid vehicle HV. In addition, the operation may be used to manually stop the hybrid system regardless of whether the hybrid vehicle HV is stationary or traveling.

Embodiments 1 and 2 above presented examples where the present invention was applied to control hybrid vehicles including two and one motor generator. Alternatively, the present invention is applicable to control a hybrid vehicle including three or more motor generators at least one of which assists the vehicle's travel driving force.

The present invention is applicable to electric and fuel cell vehicles including an electric motor as a travel driving force source, as well as to the hybrid vehicle and the conventional vehicle.

INDUSTRIAL APPLICABILITY

The present invention may be used to control a vehicle that includes a driving force source that supplies travel driving force to drive wheels. To describe it in more detail, the present invention may be effectively used for control that is implemented when the driving force source is restarted while the vehicle is traveling.

Reference Signs List

1, 401, 501 Engine (Driving Force Source)
6L and 6R, 406L, 406R, 505L and 505R Drive Wheel
100, 410, 600 ECU (Control Device)
403 Motor Generator (Driving Force Source)
500 Conventional Vehicle (Vehicle)
MG1 First Motor Generator (Driving Force Source)
MG2 Second Motor Generator (Driving Force Source)
HV, 400 Hybrid Vehicle (Vehicle)

The invention claimed is:

1. A control device for a vehicle provided with a driving force source for supplying a travel driving force to a drive wheel and capable of switching between travel mode and neutral mode, said control device, if an accelerator is on upon restarting the driving force source in the travel mode by the time when the vehicle comes to a standstill after the driving force source is manually operated to stop while the vehicle is traveling, implementing first control in which the travel driving force is gradually increased; and if the accelerator is on upon switching to the travel mode following restarting of the driving force source in the neutral mode by the time when the vehicle comes to a standstill after the driving force source is manually operated to stop while the vehicle is traveling, implementing second control in which the travel driving force is increased, the first control increasing the travel driving force not as much as the second control increases the travel driving force.

2. The control device as set forth in claim 1, wherein
the first control and the second control are implemented by controlling a driving force output from the driving force source based on a moderated accelerator opening degree obtained from an actual accelerator opening degree through a moderation process.

3. The control device as set forth in claim 2, wherein
a moderation coefficient for the moderation process is set to a greater value for relatively high actual accelerator opening degrees than for relatively low actual accelerator opening degrees.

4. The control device as set forth in claim 1, wherein
the travel driving force source includes an engine and an electric motor.

5. The control device as set forth in claim 1, wherein
the travel driving force source includes an engine only.

6. The control device as set forth in claim 1, wherein
the travel driving force source includes an electric motor only.

* * * * *